Figure 1:
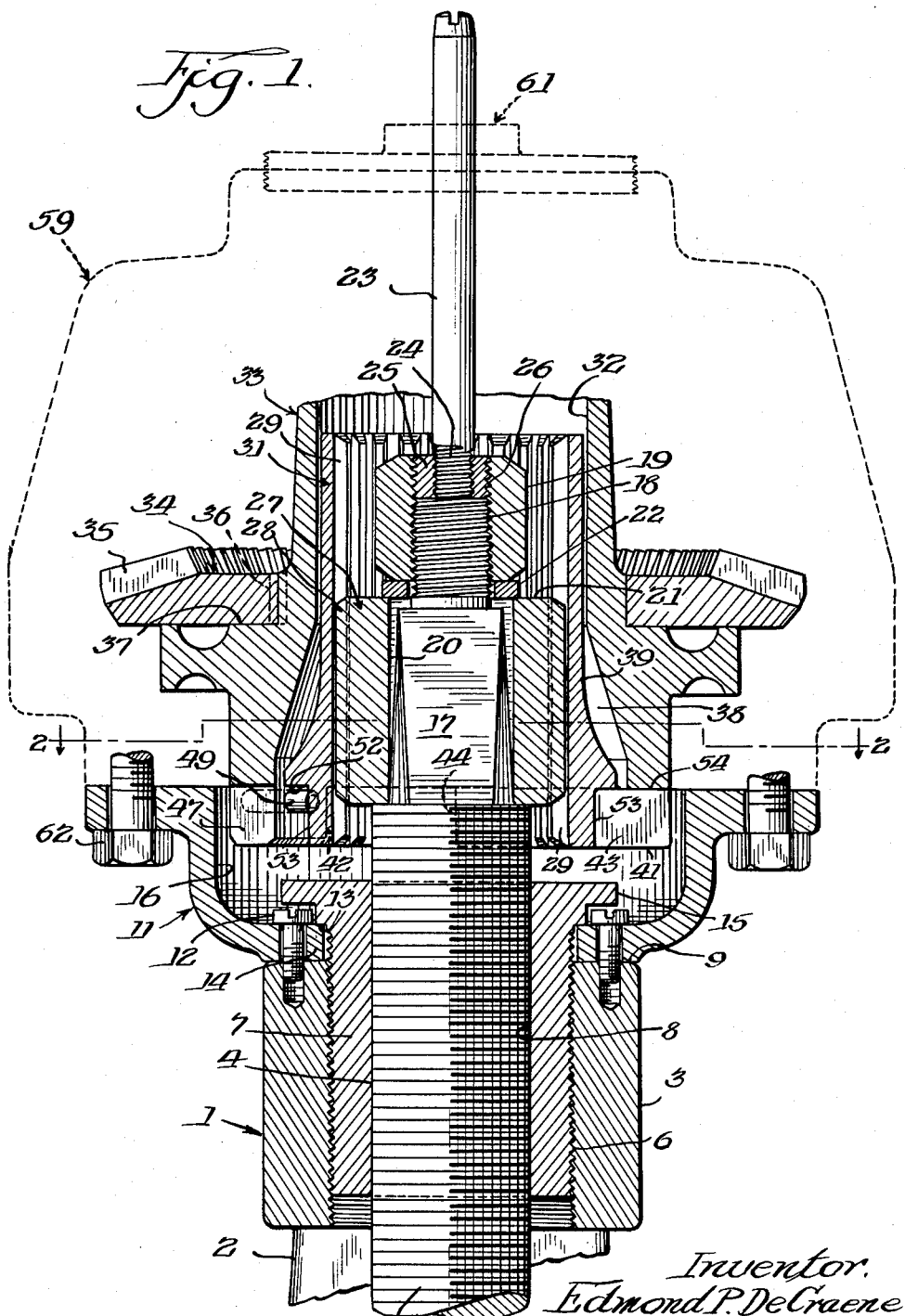

March 23, 1965

E. P. DE CRAENE 3,174,355

MOTOR OR GEAR UNIT ADAPTOR FOR VALVES
WITH RISING ROTATABLE STEMS

Filed Nov. 15, 1962

2 Sheets-Sheet 2

Inventor.
Edmond P. DeCraene.

By Joseph O. Page
Atty.

United States Patent Office 3,174,355
Patented Mar. 23, 1965

3,174,355
MOTOR OR GEAR UNIT ADAPTOR FOR VALVES
WITH RISING ROTATABLE STEMS
Edmond P. De Craene, Westchester, Ill., assignor to
Crane Co., Chicago, Ill., a corporation of Illinois
Filed Nov. 15, 1962, Ser. No. 237,876
3 Claims. (Cl. 74—431)

This invention relates broadly to valve actuating means, and, more particularly, it is directed to a demountable gear unit provided with convenient adaptor connection arrangement for attachment to a valve of the type, for example, shown on page 145 of Crane Co.'s No. 60 Catalog.

More specifically, this invention is directed to a valve actuator construction particularly suitable for globe valves of the type referred to in which the valve, for reciprocally moving the closure member, is provided with an axially movable and rotatable stem. Heretofore, in converting from direct handwheel operation, such as shown installed on the valves referred to in the said catalog, it has been difficult, even impossible in many cases, to provide an adaptor in which the manually operated valve can be quickly changed over to gear operation, either by means of a handwheel attached to the gear operator or in which the handwheel is replaced by suitable motor operated drive, such as electric motor or a hydraulic fluid motor. Therefore, it is one of the more important objects of this invention to provide a detachable valve actuating means supplementing the several types illustrated in U.S. Patent No. 3,034,371, issued May 15, 1962, and of which the instant inventor is a co-inventor.

In making the changes in the field from manual operation to gear operation, this must be done relatively economically and conveniently with a minimum change involving regular valve parts, or, in other words, the usual handwheel employed is easily removed and replaced by suitable adaptor means without employing expensive tools or involving costly shut-downs of the pipe line in which the conversion from hand operation to gear or motor operation is being effected.

It is, of course, another important object of this invention to provide for a conversion gear operator in which the operator is preferably totally enclosed, and thus not only providing suitable lubrication but also protecting the gearing against wear and damage that frequently results when the gears are exposed during service. In addition, by lubricating the gear, the efficiency of the latter is vastly improved, and, in many instances, may even enable the use of a smaller motor.

Another object of this invention is to provide for a detachable valve actuator in which the regular yoke bushing may be used when simply machined instead of the more costly ball bearing yoke sleeve as hereinafter explained in detail.

Another important object is to provide for an adaptor mechanism in which slidable engagement is provided between novel male and female splines, whereby to permit the valve stem to move axially and rotatably when the gear mechanism of the actuator is suitably rotated and without involving axial movement of the latter member.

Another object is to provide for a construction in which said splined adaptor members are suitably protected in service.

Another object is to provide for a detachable valve actuating mechanism in which a sturdy male splined adaptor is employed by means of a relatively simple attachment to the valve stem square, the latter normally receiving the handwheel in the course of manual operation.

Another object is to provide for a valve actuating mechanism in which the application of the torque provided by the geared shaft is substantially increased by the employment of a hammer-blow mechanism used in combination therewith.

Figure 2:
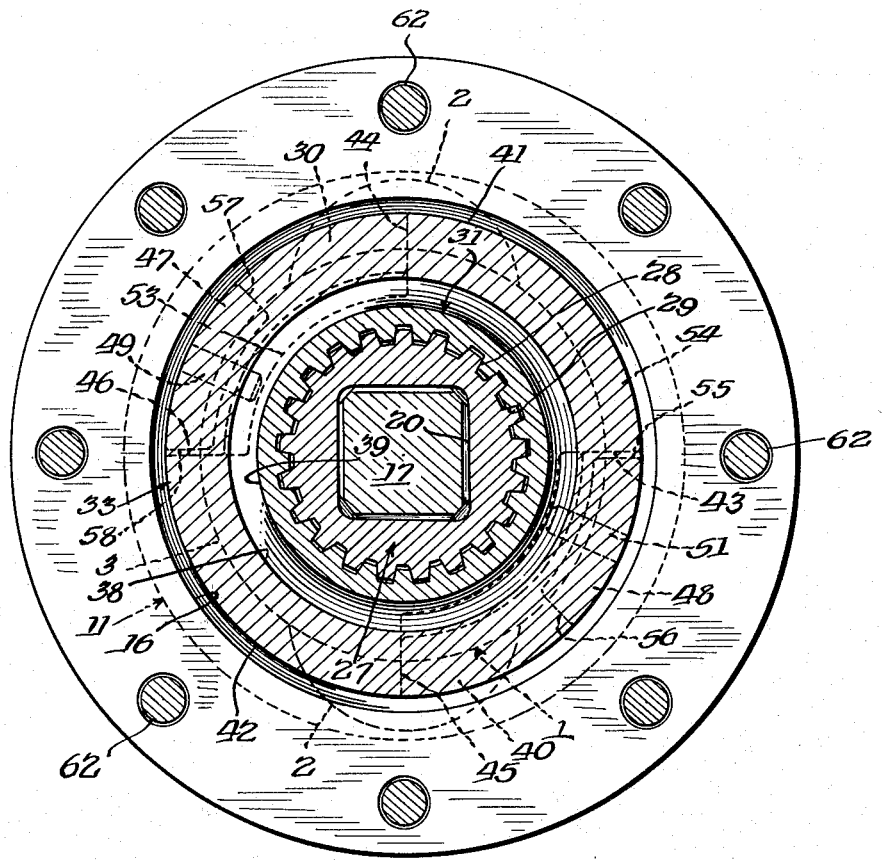

Other objects and advantages will become more readily apparent upon proceeding with the following description read in light of the accompanying drawings, in which:

FIG. 1 is a fragmentary sectional assembly view of a preferred embodiment of the actuating mechanism of this invention; and FIG. 2 is a transverse sectional view taken on the line 2—2 of FIG. 1.

Let it be assumed in referring to FIG. 1 that the valve yoke or bonnet generally designated 1 having the oppositely disposed arms 2 for support of the cylindrical hub 3 of the bonnet 1 substantially as shown more clearly in FIG. 2. The rotatable and axially movable valve stem 4 is threaded with the usual acme or other formed threads 5 to allow for reciprocating or axial movement of the valve stem upon its rotation as hereinafter described in opening and closing the valve. The bonnet hub is shown as being threaded as at 6 to receive the yoke-bushing or bonnet-bushing 7, the said bushing being threaded as at 8 to receive the threads 5 of the rotatable reciprocally movable valve stem 4.

Attached to the upper surface 9 of the bonnet hub 3, a yoke adaptor generally designated 11 is attached to the said yoke hub by a plurality of annularly disposed spaced-apart cap screws 12 before the assembly of the yoke-bushing 7 is threadedly attached to the yoke hub 3. The yoke-bushing is shouldered as at 13 whereby to establish the axial position of the said bushing relative to the annular portion 14 of the adaptor. Preferably, the rim portion designated 15 is made of polygonal configuration in order to allow for a suitable wrench to be applied to the bushing 7 in effecting the attachment of the bushing to the yoke hub. The portion 15 is preferably undercut to receive the heads of the adaptor screws 12 as illustrated. The adaptor 11 is provided with a chamber open at its upper end portion as designated at 16 for reasons hereinafter made clear. The valve stem 4 at its upper limited is provided with the usual square portion 17 normally in a manually operated valve receiving a handwheel (not shown). At its upper portion of the said polygonal portion 17, a threaded shank 18 is provided for receiving the adaptor nut 19, which replaces the usual handwhel nut normally employed between the member 19 and an upper surface 21 suporting the interposed washer 22. An an indicator rod 23 is threadedly received as at 24 into the threaded indicator ferrule 25, the latter being threadedly received as at 26 into the member 19.

In non-rotatable relation to the polygonal portion 17 of the stem 4, the male splined adaptor generally designated 27 is mounted on the stem portion 17, and being provided on its outer periphery with a plurality of radially extending uniformly distributed splines 28 for engagement with internally disposed radially extending splines 29 of the female splined adaptor generally designated 31. The said latter member is received at its upper end portion within the cylindrical chamber defined at 32 of the ring gear carrier generally designated 33 which is rotatably mounted and is supoprted in the same manner as illustrated and described in said patent. It carries the bevel gear generally designated 34 having the gear teeth 35 and preferably being held against rotation relative to the member 33 by means of a plurality of cap screws (not shown) or, if desired, by means of a lock pin 36, as indicated. The gear 34 is supported upon the annular surface 37 of the ring gear carrier 33. The ring gear carrier 33 is provided with a lower enlarged hollow portion 38 to receive the upwardly extending cylindrical portion 39 which on its interior is splined as at 29 previously referred to. Thus, the respective splines 28 and 29 are in non-rotatable engagement annularly as shown more clearly in the sectional view of FIG. 2. Oppositely disposed at an inner annular portion of the female spline 31 are a pair of lugs 41 and 42. The limits of the said lugs 41 and 42 are defined by means of the surfaces 43 and 44 and at 45 and 46 to extend arcuately for substantially ninety degrees as indicated (see FIG. 2). For interengagement with the said lugs 41 and 42, a pair of oppositely disposed forty-five degree lugs 47 and 48 being located on the inner end portion of the gear carrier member 33 are provided with the inwardly extending radially disposed groove pins 49 and 51 and preferably extending inwardly to substantially below the annular shoulder 52 and terminating just short of the annular surface portion 53 (see FIG. 2), the purpose of the pins being to prevent the female splined adaptor 31 from dropping inwardly out of position relative to its engagement with the male splined member 27.

It will accordingly be appreciated that the shoulder portion provided by the surface 54 of the female splined adaptor member 31 on the pins bears against the underside of the member 33 to retain the female spline adaptor from axial displacement outwardly.

It will be appreciated that during the course of rotative movement of said gear carrier, the lugs 47 and 48 will move within the arcuately relieved portions defined by the respective transverse surfaces 43 and 45, and 44 and 46, because the engaging lugs of the gear carrier 33 are narrower as defined by the respective surfaces 55, 56, 57, and 58, an impact or hammer-below is imparted by lost motion to the female splined adaptor both in the opening and closing directions of the valve.

It will thus be appreciated that with the gear arrangement illustrated in FIG. 1, the valve is shown in the closed position and in opening the valve, that is, rotating the splined adaptor 31 in a counterclockwise direction, an impact will thus be imparted between the surfaces 43 and 55 and 46 and 58 to provide a hammer-blow effect. Thus in opening of the valve from closed to open position, these surfaces will be in flat abutting contact.

For purpose of effecting the said driving means to the gear carrier 33 having non-rotatably mounted thereon the bevel gear 34, a suitable pinion (not shown) engages the gear teeth of the bevel gear at 35 by means of a portable geared driving mechanism generally designated 59 of the general configuration shown in Patent No. 3,034,371. As shown in said patent, of course, a handwheel may be used or a suitable motor operator bolted thereto for purpose of effecting said rotation of the gear carrier 33. A cap seal of any conventional form is indicated at 61 for purpose of retaining the lubricant and keeping out the dust during the reciprocal movement of the indicator rod 23. The said driver housing 59 is attached to the adaptor member 11 by a plurality of cap screws 62. The spaces through which the lugs 47 and 48 move arcuately are represented by the respective spaces 30 and 40, measured by the respective surfaces 44 and 46 in one case, and between 43 and 45 in the other. Thus, the said impactor provision is provided. It will be apparent that a compact, conveniently assembled, and portable operator mechanism is provided.

Let it be assumed that it is desired that a valve in the field or in service is to be fitted with the detachable operator mechanism of this invention. The first step would be to remove the handwheel nut and handwheel, both of which are not shown in the drawings, but are represented in the drawings as portions 17 and 18, then the threaded yoke bushing 7 is removed, the said bushing being suitable formed to receive the adaptor 11 and its attaching screws 12 as shown. The yoke hub portion 3 is then drilled and tapped to receive the cap screws 12 for attachment of the adaptor 11. Upon assembly of the adaptor 11 by means of said set screws to the yoke hub 3, the complete assembly comprising the gear 34, the carrier 33, and the telescoped inner and outer splined adaptors are mounted over the stem carrier 17. Thus, it is only necessary to specially treat the upper end portion of the yoke hub 3 and re-assemble the yoke bushing with the adaptor member 11 in place and the operator is ready to be used, the bolts 62 holding the driving mechanism firmly in place on the adaptor 11.

While only a single embodiment has been shown and described, it will, of course, be appreciated that this is for purpose of illustration and not of limitation, and the scope of this invention should therefore be measured by the appended claims.

I claim:

1. Adaptor connection means to a gear operator for valves having a rising-rotatable threaded valve stem;

a valve yoke member therefor;

a valve yoke adaptor member for mounting said valve yoke member and around said valve stem;

gear carrier means on the gear operator having transverse driving lugs diametrically opopsite of about 45 degree configuration when viewed in plan, the said gear carrier means being rotatably mounted above said valve yoke member with a lower portion thereof constituting said transverse driving lugs and being received within said valve yoke adaptor member;

a driven gear non-rotatably mounted on the said gear carrier of said gear operator means and rotatable therewith;

a male splined adaptor member non-rotatably mounted on an outer end portion of said stem;

a yoke bushing mounted in the valve yoke and being threaded to receive the said valve stem;

a female splined adaptor member mounted telescopically to engage said male splined adaptor member, the said female splined adaptor member and the male splined adaptor member being relatively axially movable upon predetermined rotation of said driven gear and said threaded stem;

said female splined adaptor member being rotatably driven by said gear carrier means and having thereon at an end portion outwardly extending arcuately disposed diametrically spaced apart transverse driven lugs of about 90 degree configuration when viewed in plan for engagement by said driving lugs of the gear carrier means whereby to provide for a driving connection between said female splined adaptor member and said lugs of the gear carrier means and for lost motion and impact between the said lugs of the gear carrier means and the lugs of the female splined adaptor member upon predetermined rotation of the gear carrier means in either direction; and adaptor nut means cooperating with said stem for retaining the said male splined adaptor member on the stem against axial movement.

2. The subject matter of claim 1, the said gear carrier means having inwardly extending pin means radially mounted thereon and cooperating with an annular shoulder surface of said female splined adaptor member to retain said latter member in predetermined axial position relative to the engagement with the said male splined adaptor member.

3. The subject matter of claim 1, the said gear carrier means being relieved to provide a lower enlarged hollow portion to receive said male splined adaptor member and said female splined adaptor member.

References Cited by the Examiner

UNITED STATES PATENTS

| | | | |
|---|---|---|---|
| 1,635,349 | 7/27 | Sandilands | 116—125 |
| 2,202,679 | 5/40 | Woodin | 287—53 |
| 2,266,283 | 12/41 | Spengler | 287—53 |
| 2,934,036 | 4/60 | Anderson | 116—125 |
| 3,034,371 | 5/62 | Cantalupo et al. | 74—423 |
| 3,063,307 | 11/62 | Stvan et al. | 74—625 |

OTHER REFERENCES

Crane Co. Catalogue No. 60, 1960, published for Crane Co., 4100 South Kedzie Avenue, Chicago 32, Illinois. Patent Office Library Call No. TH-6255-C84.

BROUGHTON G. DURHAM, *Primary Examiner.*